United States Patent

Duparre et al.

(10) Patent No.: US 9,383,557 B2
(45) Date of Patent: Jul. 5, 2016

(54) DEVICE FOR OPTICAL IMAGING

(75) Inventors: Jacques Duparre, Jena (DE); Frank Wippermann, Meiningen (DE); Andreas Brueckner, Jena (DE); Andreas Braeuer, Schloeben (DE); Robert Leitel, Jena (DE); Reinhard Voelkel, Neuchatel (CH)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 382 days.

(21) Appl. No.: 13/485,476

(22) Filed: May 31, 2012

(65) Prior Publication Data

US 2013/0057748 A1 Mar. 7, 2013

Related U.S. Application Data

(63) Continuation of application No. PCT/EP2010/068159, filed on Nov. 24, 2010.

(30) Foreign Application Priority Data

Dec. 1, 2009 (DE) .......................... 10 2009 047 361

(51) Int. Cl.
*G02B 13/00* (2006.01)
*G02B 5/00* (2006.01)
(Continued)

(52) U.S. Cl.
CPC .......... *G02B 13/0095* (2013.01); *G02B 3/0062* (2013.01); *G02B 5/005* (2013.01); *G02B 13/26* (2013.01); *G02B 21/0008* (2013.01)

(58) Field of Classification Search
CPC ........ G02B 3/00; G02B 3/0006; G02B 3/005; G02B 3/0056; G02B 3/0062; G02B 3/0068; G02B 3/0075; G02B 5/005; G02B 9/00; G02B 9/12; G02B 13/0095; G02B 13/12; G02B 13/26
USPC .......................................... 359/434–435, 619
See application file for complete search history.

(56) References Cited

U.S. PATENT DOCUMENTS 3,584,952 A 6/1971 Gundlach
4,215,933 A * 8/1980 Feneberg ............... G02B 13/24
355/50

(Continued)

FOREIGN PATENT DOCUMENTS

GB 1248362 9/1971
GB 1254450 11/1971
(Continued)

*Primary Examiner* — Thong Nguyen
(74) *Attorney, Agent, or Firm* — Perkins Coie LLP; Michael A. Glenn (57) ABSTRACT

A device for optically imaging at least part of an object onto an area of a digital image sensor includes an optical channel, which includes a first imaging lens arranged on a first substrate, a second imaging lens arranged on a second substrate, and a field lens arranged on a third substrate. The first and second imaging lenses are identical and arranged such that a first surface of the first imaging lens is a light entry surface of the optical channel and that a first surface of the second imaging lens is a light exit surface of the optical channel. The field lens is arranged between the first imaging lens and the second imaging lens such that an axis running perpendicularly to the lateral extension of the optical channel and through a lateral center of the field lens forms a symmetry axis of the optical channel.

8 Claims, 8 Drawing Sheets (51) Int. Cl.
*G02B 3/00* (2006.01)
*G02B 13/26* (2006.01)
*G02B 21/00* (2006.01)

(56) References Cited

U.S. PATENT DOCUMENTS

| | | | |
|---|---|---|---|
| 5,650,876 A * | 7/1997 | Davies et al. | 359/622 |
| 6,381,072 B1 | 4/2002 | Burger | |
| 6,560,040 B2 * | 5/2003 | Kaneko et al. | 359/739 |
| 6,724,544 B2 * | 4/2004 | Kishima et al. | 359/719 |
| 6,856,463 B2 * | 2/2005 | Toyama | 359/621 |
| 7,433,042 B1 * | 10/2008 | Cavanaugh | G01J 3/02 356/419 |

FOREIGN PATENT DOCUMENTS

| | | |
|---|---|---|
| JP | 56-142510 | 11/1981 |
| JP | 64-017017 | 1/1989 |
| JP | 2001-352429 | 12/2001 |
| JP | 2002-318348 | 10/2002 |
| JP | 2004-109532 | 4/2007 |

* cited by examiner

DEVICE FOR OPTICAL IMAGING

CROSS-REFERENCE TO RELATED APPLICATIONS

This application is a continuation of copending International Application No. PCT/EP2010/068159, filed Nov. 24, 2010, which is incorporated herein by reference in its entirety, and additionally claims priority from German Application No. 102009047361.0-51, filed Dec. 1, 2009, which is also incorporated herein by reference in its entirety.

The present invention relates to a device for optical imaging of an object to a digital image sensor, which may be applied, for example, in digital microscopy and/or macrophotography.

BACKGROUND OF THE INVENTION

Classical microscopes with purely optical magnification may use a very large optical lever for achieving large image distances at short camera-to-subject distances. Said so-called large optical levers result in long lens tube lengths and thus in long constructional lengths of the microscopes. Known conventional microscope structures may have heights ranging from 25 to 50 cm. As magnification increases, the observable object field in classical microscopes becomes smaller. Classical microscopes are still optical-mechanical precision instruments that are corrected with a lot of effort and are therefore expensive to manufacture.

Due to their small pixel sizes, new digital image sensors now for the first time enable photographing of small object details, depending on the pixel size at optical 1:1 imaging, that is, image field=object field, or at only very small optical magnification, said technology being referred to as digital macrophotography. A disadvantage of this technique is that when the constructional length of a corresponding objective is reduced and in the event of large object dimensions, oblique passage of the light results at the edge of the image field through the macro objective and/or the one lens channel and, thus, extremely strong aberrations result at the edge of the image field (so called off-axis aberrations), whereby the image quality is highly effected or expensive correction may need to be performed.

To achieve low constructional heights of digital imaging systems, a concept of utilizing several optical channels continues to exist. Said so called array approach enables parallel transmission of adjacent object parts into neighboring image parts by periodically adjacently arranged, identical objectives and/or imaging channels which do not or only slightly influence one another. As a result, image transmission is essentially performed perpendicularly again (except for the small angles of field within the individual channels), that is, as opposed to the one-channel variants, no oblique passage of the light will result at the edge of the image field, the object field scaling with the image sensor size and/or the number of channels used, and the constructional length being independent thereof. One disadvantage of this array approach is that due to the array geometry of the arrangement, artifacts in the image may possibly result. Said artifacts may translate, for example, into modulation of the resolution, brightness or magnification, depending on the period of the array. A further problem is optical crosstalk between the different channels, the prevention of which is critical. Due to said utilization of several channels, both the object field and the image field are subdivided into several partial object fields and partial image fields, depending on the number of channels. To this end, in the array approach described, there are different variants of combining object field joint and image field joint, i.e. of assembling the partial object fields and partial image fields.

In addition, variants wherein several channel contribute to the formation of an image point (pixel), which thus have a higher level of luminosity, differ from variants wherein only one channel contributes to the formation of the image point, which have a higher resolution.

In summary, one may state that in known conventional technology, there is no concept which combines imaging of laterally extended close objects, i.e. comprising a small distance of the object from an imaging system, at a high level of image quality with a small constructional height of the imaging system.

SUMMARY

According to an embodiment, a device for optically imaging at least part of an object onto an area of a digital image sensor may have: an optical channel including a first imaging lens arranged on a first substrate, a second imaging lens arranged on a second substrate, and a field lens arranged on a third substrate; the first imaging lens and the second imaging lens being identical; the first imaging lens and the second imaging lens being arranged such that a first surface of the first imaging lens is a light entry surface of the optical channel and that a first surface of the second imaging lens is a light exit surface of the optical channel; the field lens being arranged between the first imaging lens and the second imaging lens such that an axis running perpendicularly to the lateral extension of the optical channel and through a lateral center of the field lens forms a symmetry axis of the optical channel; and at least one of the lenses including at least one diaphragm arranged within a lens body of the lens.

The core idea of the present invention is that in a device for optically imaging at least part of an object onto an image area of a digital image sensor, which device comprises an optical channel having two imaging lenses and a field lens, an improved ratio of image quality and constructional height may be achieved when the field lens is arranged between the first imaging lens and the second imaging lens such that an axis, which runs perpendicularly to the lateral extension of the optical channel and through a lateral center of the field lens, forms a symmetry axis of the optical channel. The two imaging lenses are therefore identical in terms of their shapes, but in particular in terms of their optical properties, and they will only differ from each other to a minor extent, for example within the manufacturing tolerances. A first surface, facing the object, of the first imaging lens thus images a light entry surface of the optical channel, and a first surface, facing the image sensor, of the second imaging lens thus forms a light exit surface of the optical channel. The lateral extension of the optical channel thus runs along an axis though the center of the light entry surface of the optical channel and through the center of the light exit surface of the optical channel, which also defines a main ray of the optical channel.

Thus, it is an advantage of the present invention that due to the symmetrical arrangement of the optical channel, 1:1 imaging of part of an object to an area of an image sensor is made possible, which results in improved ratio of the image quality and the constructional height of the device. The maximally detectable object area will then no longer be dependent on the constructional height of the device, but on the size of the optically active surface of the image sensor, and it will scale with same.

In embodiments of the present invention, several optical channels may be arranged in a hexagonal distribution, it being possible for the detection areas of the optical channels to partly overlap, for example in their edges.

A further advantage of the present invention thus consists in the fact that since only part of an object is imaged onto an area of an image sensor, the maximal object size to be photographed does not scale with the constructional height of the device, but with the number of channels used. Magnification of the object area to be detected thus will lead to an increased number of optical channels and possibly to an increase in the optically active area of the image sensor, but it will not lead to an increase in the lateral extension of the optical channels or to an increase in the constructional height of the device for optical imaging.

BRIEF DESCRIPTION OF THE DRAWINGS

Embodiments of the present invention will be detailed subsequently referring to the appended drawings, in which.

DETAILED DESCRIPTION OF THE INVENTION

Before the present invention will be explained in more detail below with reference to the drawings, it shall be noted that identical elements in the figures have been provided with identical or similar reference numerals and that repeated descriptions of said elements will be omitted.

Figure 1A:
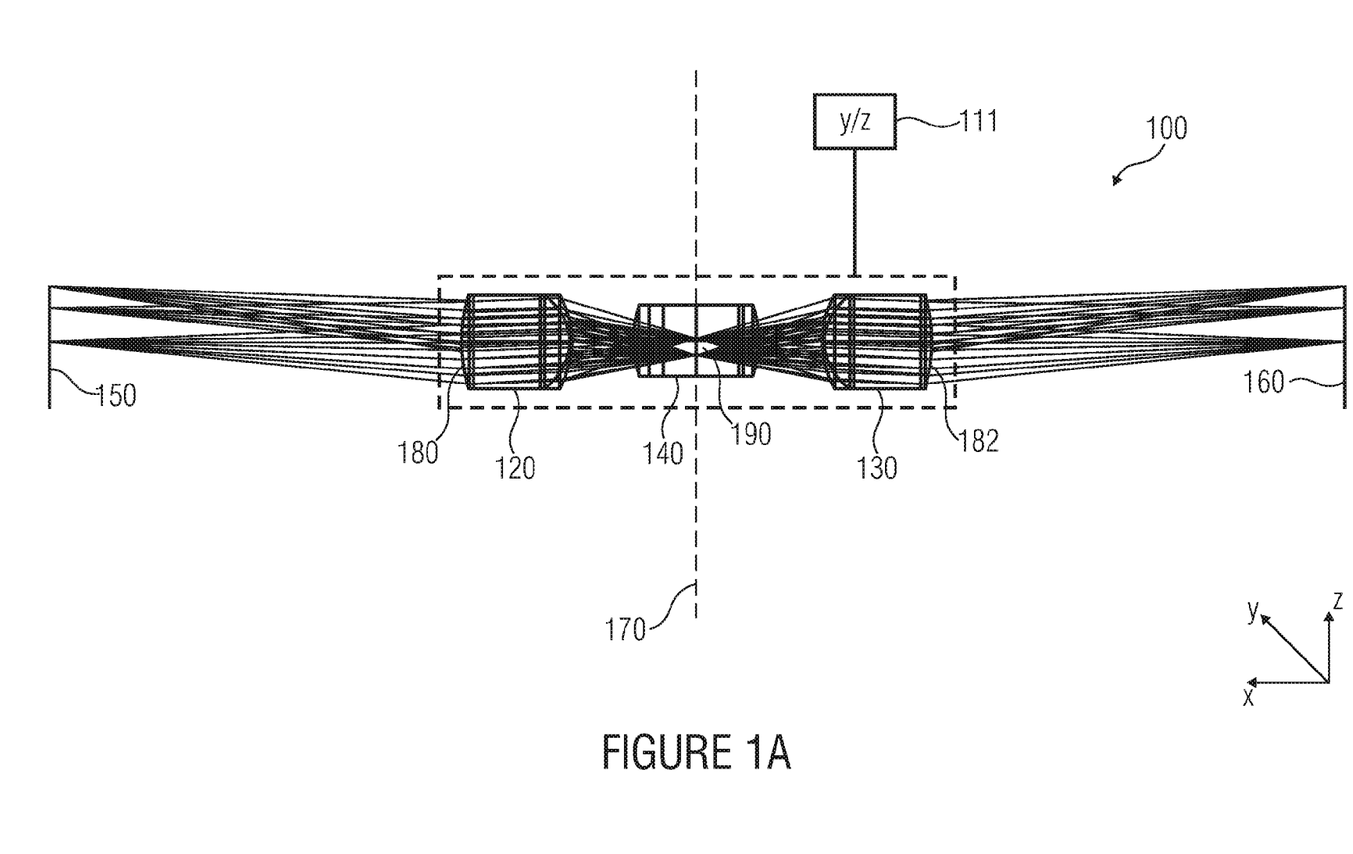
FIGS. 1a and 1b show schematic representations of a device for optical imaging in accordance with an embodiment of the present invention.

FIG. 1a shows a schematic representation of a device 100 for optical imaging in accordance with an embodiment of the present invention. The schematic representation shows a sectional view of an xz plane of the device 100. The extension of the device 100 in the y direction is not depicted here. The device 100 includes an optical channel 110. The optical channel includes a first imaging lens 120 and a second imaging lens 130, both imaging lenses 120, 130 being identical in terms of their shapes and, above all, of their optical modes of operation, or differing only marginally within manufacturing tolerances. A field lens 140 is arranged halfway between the first imaging lens 120 and the second imaging lens 130. An object to be imaged by the device 100 may be located within an object plane 150, for example. The imaging, created by the device 100, of at least part of the object, which will also be referred to as an object area to be imaged in the following, within the object plane 150 may be located within an image plane 160, for example. The entire device 100 and, thus, also the optical channel 110 are symmetrical about a symmetry axis 170 which extends, in the z direction, through a center of the field lens 140 and perpendicularly to the lateral extension in the x direction of the optical channel 110.

Light coming in from the object plane 150 impinges upon a first surface of the first imaging lens 120, which is also a light entry surface 180 of the optical channel 110. The first imaging lens 120 focuses the incoming light so that a demagnified intermediate image of the object area to be imaged will result within an intermediate-image plane 190, which is located in parallel to the object plane 150 and to the image plane 160 in a yz plane and extends through the center of the field lens 140, i.e. the center of the optical channel 110 and of the device 100. The intermediate image forming within the intermediate-image plane 190 is upside down as compared to the object area to be imaged, and is laterally reversed. Large-scale intermediate-image demagnification as compared to the object area to be imaged is advantageous, since this enables utilization of diaphragms having small diaphragm diameters, which may result in effective suppression of phantom light. Due to the symmetrical arrangement of the device 100 and/or of the optical channel 110 about the symmetry axis 170, the optical path of the incident light from the object plane 150 to the intermediate-image plane 190 is mirrored to the optical path of the light from the intermediate-image plane 190 to the image plane 160. The light emanating from the intermediate-image plane 190 impinges upon the second imaging lens 130 and is scattered onto the image plane 160 from a first surface of the imaging lens 130, which is also a light exit surface 182 of the optical channel 110. Due to the symmetry of the device 100 and/or of the optical channel 110, the dimensions of the image area detected are identical with the dimensions of the object area imaged. In other words, 1:1 imaging is achieved. For example, a digital image sensor may be arranged within the image plane 160. Due to the symmetry of the device 100 and/or of the optical channel 110, and due to the 1:1 imaging resulting therefrom, the dimensions of the photoactive surface of the image sensor are equal to the dimensions of the maximally detectable surface of the object area. In this context, the optical channel 110 may image, e.g., part of an object to be detected within the object plane 150 to an area of the image sensor.

In further embodiments, the device 100 might additionally comprise further optical channels 110, which are identical with or slightly deviate from one another within manufacturing tolerances. The optical channels 110 might be arranged in a hexagonal distribution, for example, and might partially overlap in their detection areas. The size of the object area detected will then not scale with the lateral extension of the device 100, but with the number of optical channels used, and its maximum is limited by the optically active surface of the image sensor. To image a larger object field, in further embodiments of the invention, several image sensors might be arranged within the image plane 160 which are mutually electrically connected. This has no influence on the lateral extension of the device 100, that is on the constructional height, which may be kept consistently low.

Thus, embodiments of the invention enable imaging of laterally extended close objects, for example having a distance of less than 10 mm of an object plane 150 from a light entry surface 180 of an optical channel 110, at an improved ratio of image quality and constructional height as compared to already known imaging systems.

Figure 1B:
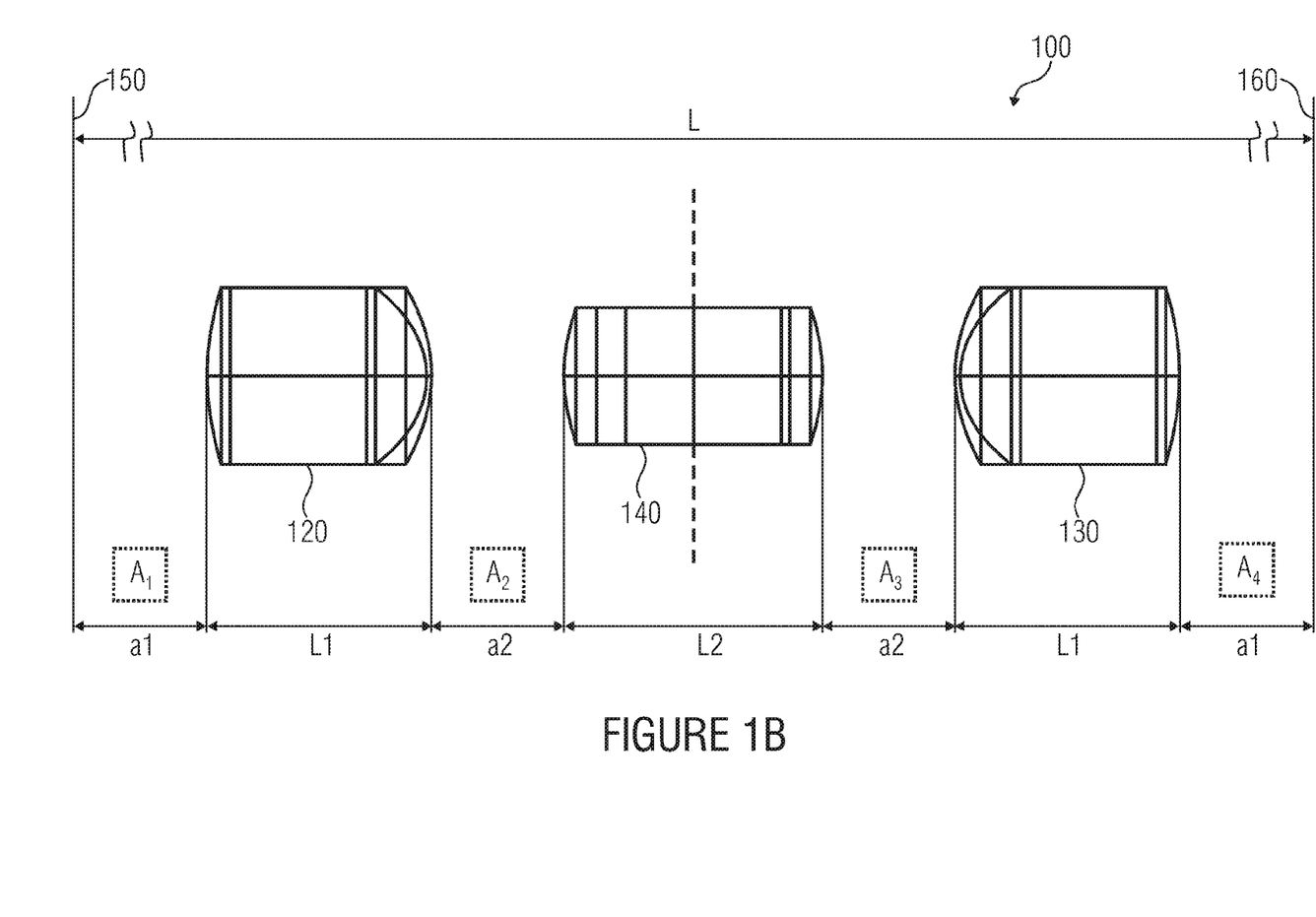

By way of example, FIG. 1b shows values of the individual distances in the x direction between the lenses as well as between the image and object planes, as may be used, for example, in the device 100 shown in FIG. 1a. In addition, the symmetry of the device 100 is illustrated again. The values shown in FIG. 1b are intended to serve as exemplary values only; of course, other values are possible here when taking into account the symmetry of the device 100 about the symmetry axis 170. It shall be noted once again at this point that in the device 100 shown in FIG. 1b, a magnification of the object field to be viewed within the object plane 150 may be caused by increasing the number of optical channels 110 and magnifying the optically active surface of an image sensor located within the image plane 160, but that the lateral extension of the device 100 in the x direction L (in FIG. 1b, L is about 3.9 mm) may be kept constant. In the specific embodiment shown in FIG. 1b, the distance a1 of the object plane 150 from the light entry surface 180 of the optical channel 110, which is also the first surface of the first imaging lens 120, amounts to 1303 µm. The first imaging lens 120 has a lateral dimension L1 of 340.9 µm, which is identical with the lateral dimension L1 of the second imaging lens 130. A second surface of the first imaging lens 120 has a distance of 198.7 µm (a2) from a first surface of the field lens 140. The field lens 140 has a lateral dimension L2 of 381.4 µm, the symmetry axis 170 of the optical channel 110 and/or of the device 100 extending through the center of the field lens 140. The second imaging lens 130 has a distance of 198.7 µm (a2) from the field lens 140. The distance a1 between the image plane 160 and the light exit surface 182 of the optical channel 110 amounts to 1303 µm in the specific embodiment.

Figure 2A:
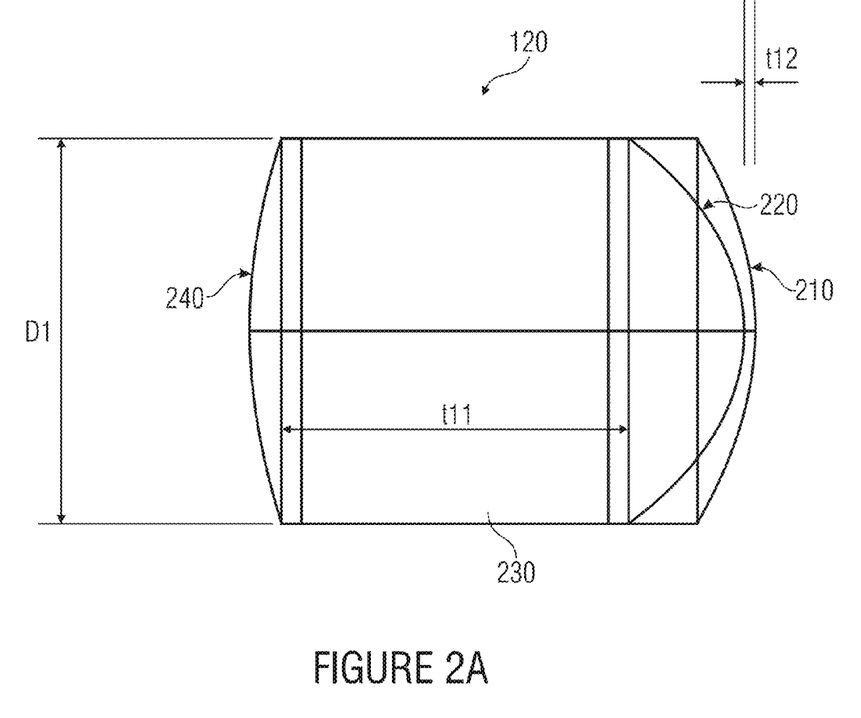
FIGS. 2a to 2b show sectional views of an imaging lens for utilization in an embodiment of the present invention.
Figure 2B:
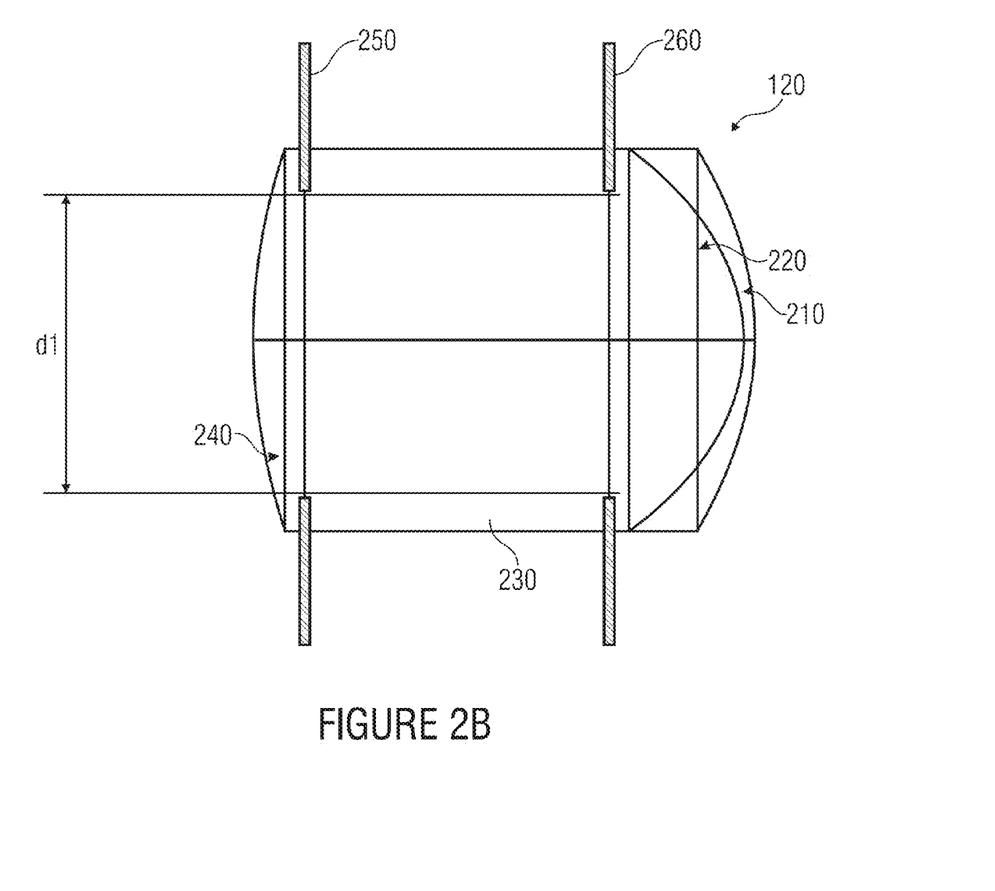

FIGS. 2a to 2b show sectional views of an imaging lens for utilization in an embodiment of the present invention, which might be one of the two imaging lenses 120, 130, for example in the device 100 shown in FIG. 1a. Since both imaging lenses 120 and 130 are identical, only the first imaging lens 120 will be described below and shall also stand for the second imaging lens 130.

The imaging lens 120 shown in FIG. 2a has a first lens surface 210 comprising a convex curvature. The first lens surface 210 thus forms the second surface, described in the previous embodiment, of the first imaging lens 120. In the specific embodiment shown in FIG. 2a, the first lens surface 210 has a radius of 241.3 µm, a k parameter (taper) of 0, a rise (arrow height) of 38.0 µm and a base parameter of 43.9 µm. A second lens surface 220 having a convex curvature is arranged adjacently to the first lens surface 210. In the specific embodiment shown in FIG. 2a, the second lens surface 220 has a radius of 152.5 µm, a k parameter (taper) of 0, a rise of 72.8 µm and a base parameter of 14.3 µm. A lens body 230 is arranged adjacently to the second lens surface 220. In the specific embodiment shown in FIG. 2a, the lens body 230 has a lateral extension t11 of 228.2 µm. The lens body 230 has a third lens surface 240 arranged adjacently thereto, wherein a convex curvature is configured inversely to the convex curvature of the first lens surface 210 and of the second lens surface 220. Thus, in the embodiment shown in FIGS. 1a and 1b, the third lens surface 240 forms the first surface of the first imaging lens 120 and, thus, the light entry surface 180 of the optical channel 110 and additionally the first surface of the second imaging lens 130 and, thus, the light exit surface 182 of the optical channel 110.

In the specific embodiment shown in FIG. 2a, the third lens surface 240 has a radius of 343.2 µm, a k parameter (taper) of −8.28, a rise of 20.3 µm and a base parameter of 14.5 µm. The imaging lens 120 may advantageously be a cylindrical body, which has a diameter R of 260 µm in the specific embodiment shown in FIG. 2a.

In the specific embodiment, shown in FIG. 2a, of the lens 120, the first lens surface 210 is made of a polymer material having a high refractive index (n=1.63 at a wavelength of 588 nm) and a low Abbe number (V=26 at a wavelength of 588 nm), the second lens surface 220 is made of a polymer material having a low refractive index (n=1.52 at a wavelength of 588 nm) and a high Abbe number (V=52 at a wavelength of 588 nm), the lens body 230 is made of a glass material having a refractive index of n=1.52 and an Abbe number of V=56 (at a wavelength of 588 nm), and the third lens surface 240 is made of a polymer material having a low refractive index (n=1.52 at a wavelength 588 µm) and a high Abbe number (V=52 at a wavelength of 588 nm). Due to the utilization of two different materials having different dispersion properties, the two lens surfaces 210 and 220 arranged one above the other form an achromatic lens which enables correction of the longitudinal chromatic flaw (aberration).

FIG. 2b shows a possible diaphragm arrangement for the imaging lens 120 described in FIG. 2a. The diaphragm arrangement shown in FIG. 2b includes a first diaphragm 260, which has a distance t12 (cf. FIG. 2a) of 9.1 µm from the second lens surface 220 and is arranged within the lens body 320, and a second diaphragm 250 which has a distance t12 (cf. FIG. 2a) of 9.1 µm from the third lens surface 240 and is arranged within the lens body 320. The two diaphragms 250 and 260 are identical in terms of their dimensions. In the specific embodiment shown in FIG. 2b, both diaphragms 250 and 260 have an opening diameter d1 of 232 µm.

The diaphragms 250, 260 may serve to suppress veiling glare in an optical channel 110 in which the imaging lens 120 is used.

Figure 3A:
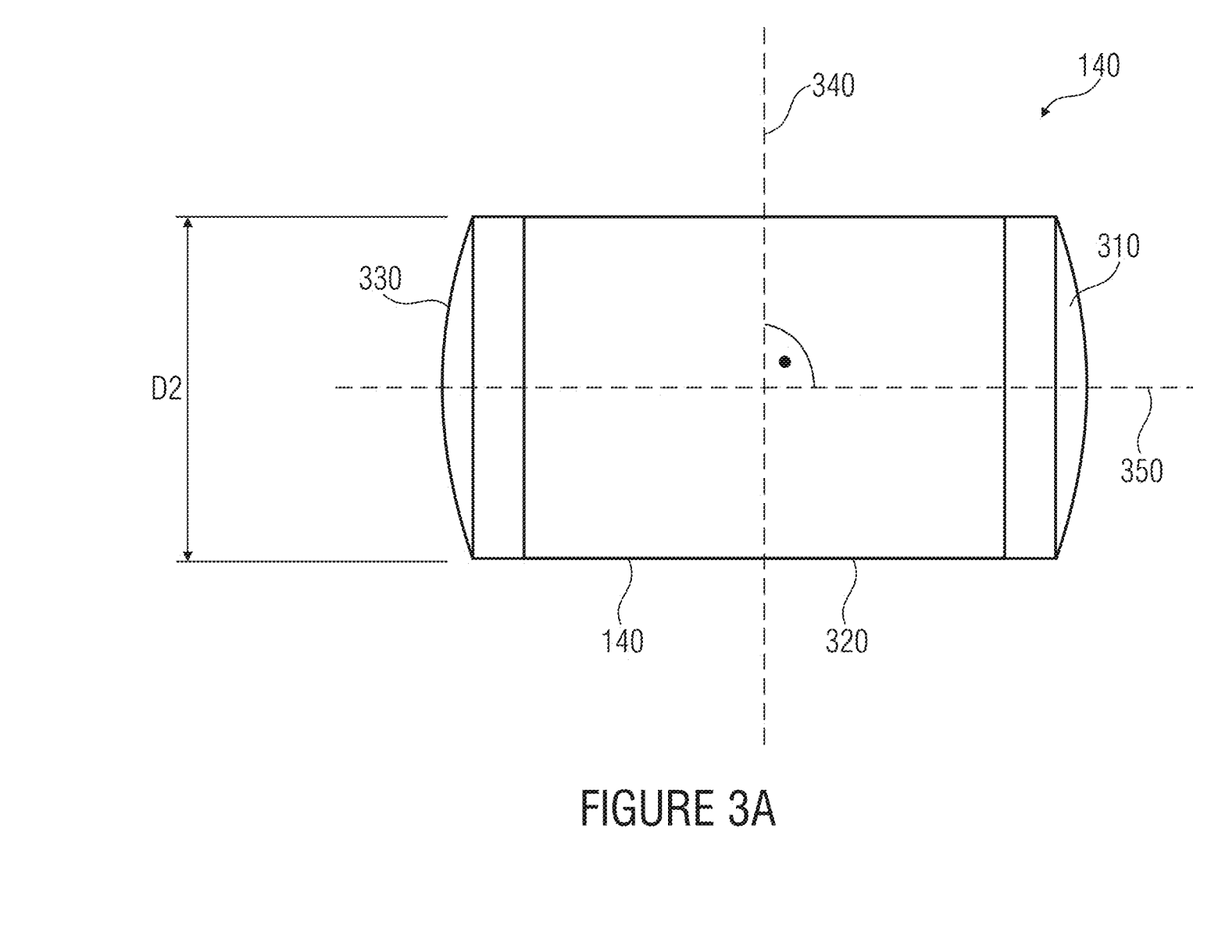
FIGS. 3a to 3c show sectional views of a field lens for utilization in an embodiment of the present invention.
Figure 3B:
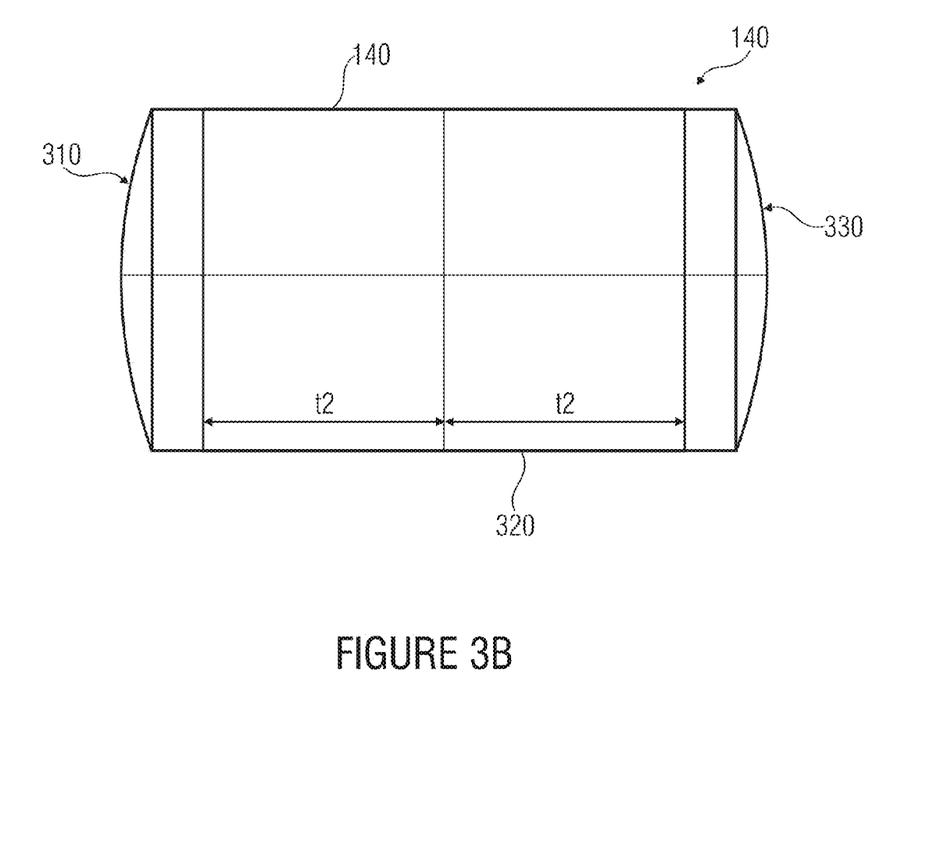
Figure 3C:
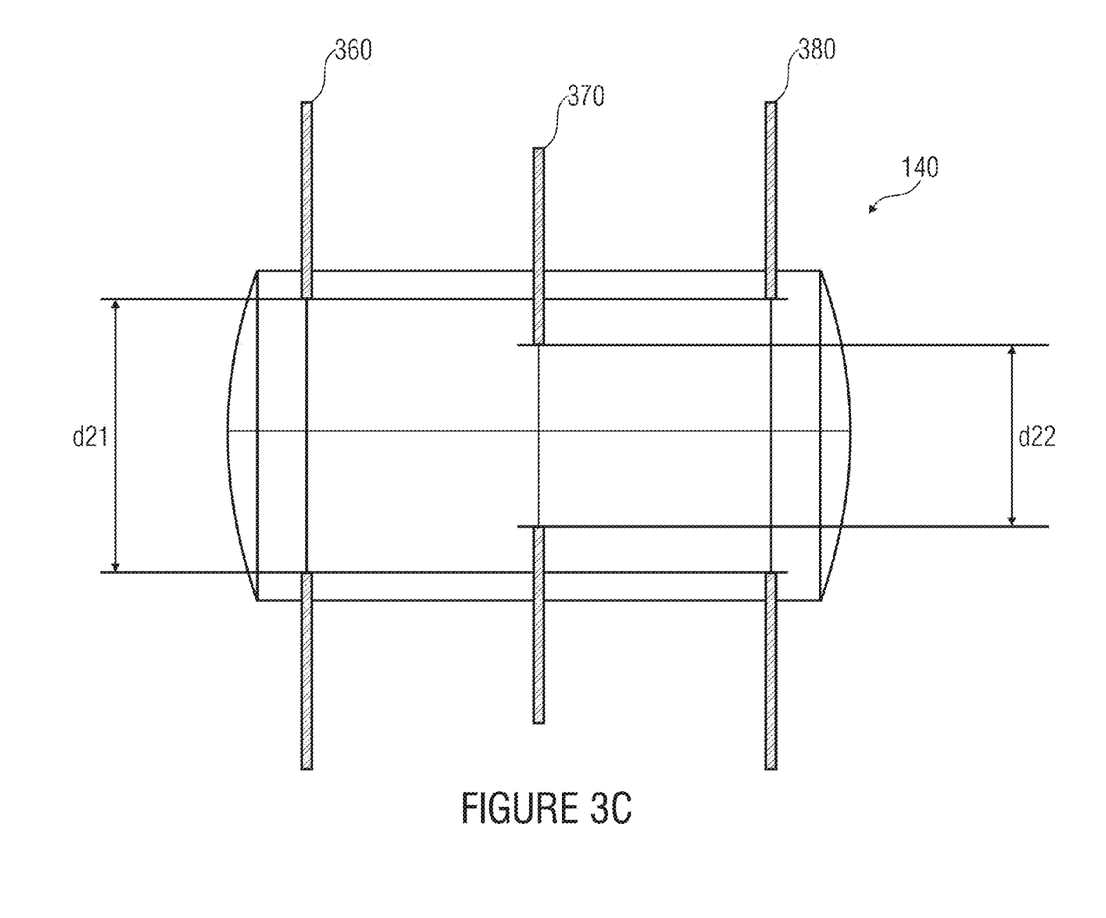

FIGS. 3a to 3c show sectional views of a field lens 140 for utilization in an embodiment of the present invention, which might be the field lens 140 in the device 100 described in FIG. 1a, for example.

The field lens 140 shown in FIG. 3a has a first lens surface 310 comprising a convex curvature. A lens body 320 is arranged adjacently to the first lens surface 310. The lens body 320 has a second lens surface 330 arranged adjacently to it which is identical with the first lens surface 310 and comprises a convex curvature that is inverse to the convex curvature of the first lens surface 310. In the specific embodiment shown in FIG. 3a, the first lens surface 310 and the second lens surface 330 have a radius of 270.9 µm, a k parameter (taper) of 0, a rise of 19.1 µm and a base parameter of 30.1 µm. The field lens 140 is advantageously a cylindrical body, which in the specific embodiment shown in FIG. 3a has a diameter d2 of 200 µm. The field lens 140 is symmetrical about a symmetry axis 340 in the z direction, which extends through a lateral center of the field lens 140 and is perpendicular to an axis of rotation 350 in the x direction through the lateral center of the field lens 140.

FIG. 3b shows the field lens 140 described in FIG. 3a. In the specific embodiment, shown in FIG. 3b, of the field lens 140, the first lens surface 310 and the second lens surface 330 are made of a polymer material having a low refractive index (n=1.52 at a wavelength of 588 nm) and a high Abbe number (V=52 at a wavelength of 588 nm), and the lens body 320 is made of a glass material having a refractive index of n=1.52 and an Abbe number of V=56 (at a wavelength of 588 nm).

FIG. 3c shows the field lens 140, which is described in FIGS. 3a and 3b, as having a diaphragm arrangement, for example for determining the aperture of an optical channel 110 in which the field lens 140 is used. The diaphragm arrangement includes a first diaphragm 360, a second diaphragm 370 and a third diaphragm 380. Due to the symmetry of the field lens 140, the first diaphragm 360 and the third diaphragm 380 are arranged at the same distance t2 of 145 µm from the symmetry axis 340 in the lens body 320 and adjacently to the first lens surface 310 and in the lens body 320 and adjacently to the second lens surface 330. The second diaphragm 370 is arranged at the lateral center of the field lens 140, i.e. it extends on the symmetry axis 340. When using the field lens 140, the second diaphragm 370 may determine the maximum intermediate-image size of an optical channel 110 in an embodiment of the present invention. In the specific embodiment, shown in FIG. 3c, of the field lens 140, the first diaphragm 360 and the third diaphragm 380 have an opening diameter d21 of 144 µm. The third diaphragm 370, which predefines, e.g., the aperture of the field lens 140, advantageously has a hexagonal opening. The outer circle diameter d22 of the opening of the diaphragm 370 may amount to, e.g., 84.5 μm, 83.5 μm or 85.5 μm in the specific embodiment shown in FIG. 3c. When the field lens 140 is used in a device in accordance with an embodiment, the diaphragm 370 may represent, e.g., a field diaphragm and/or an aperture diaphragm of the optical channel 110 in which it is used, and it may therefore define the detected area of the object field of the optical channel 110.

The first diaphragm 360 and the third diaphragm 380 might be formed of a black, absorbing polymer material, for example, in the specific embodiment shown in FIG. 3c.

In the embodiment shown in FIG. 3c, the second diaphragm 370 might be formed of a metal, for example.

Figure 4:
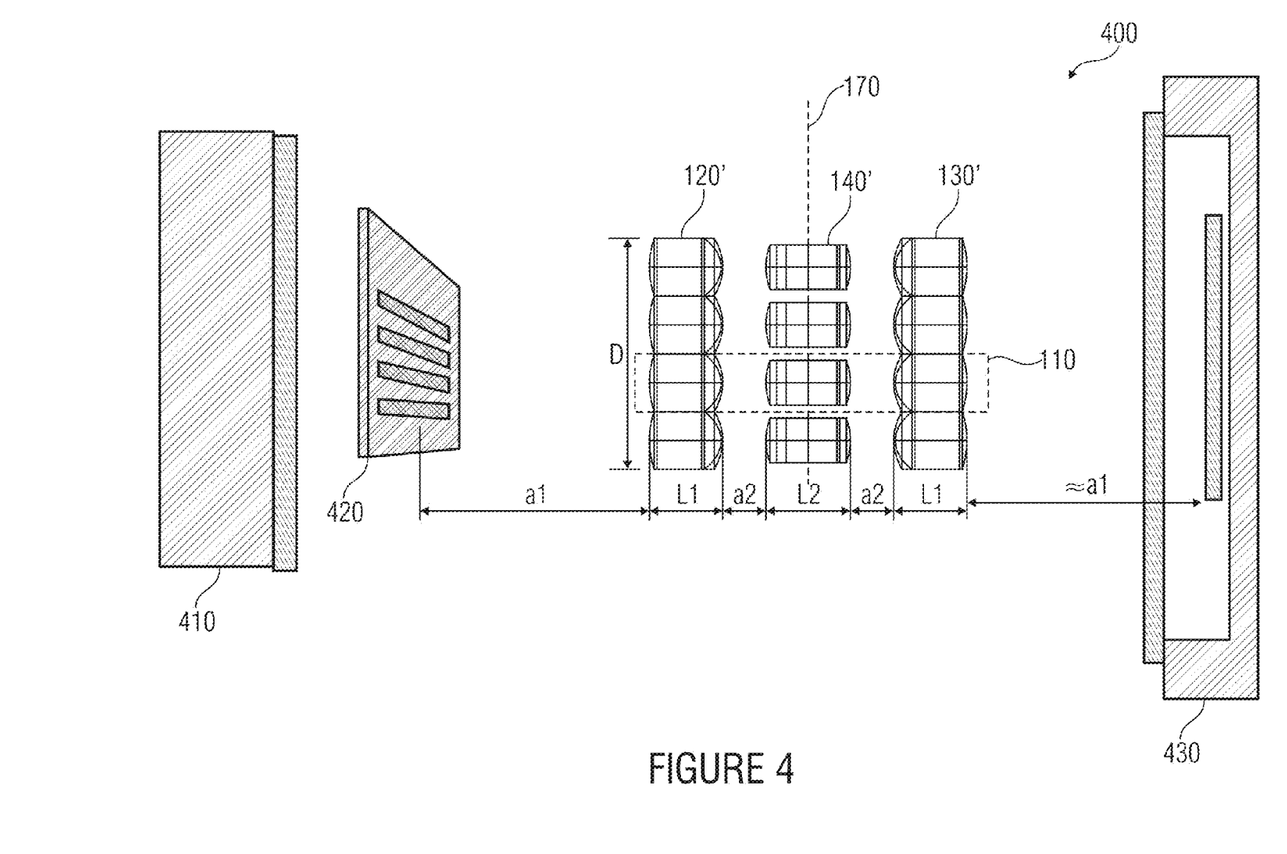
FIG. 4 shows a schematic representation of a device for optical imaging in accordance with an embodiment of the present invention.

FIG. 4a shows a device 400 in accordance with an embodiment of the present invention. The device 400 includes an illumination means 410, for example an LED background lighting. A test pattern 420 is arranged adjacently to a light emitting surface of the illumination means 410. A microlens array 120' borders on the test pattern at a distance a1 of 1.3 mm. The microlens array 120' includes a plurality of first imaging lenses 120, as was described, for example, in FIGS. 2a to 2b. A second microlens array 140' is arranged at a distance a2 of about 200 μm from the first microlens array 120'. The second microlens array 140' includes a plurality of field lenses 140 as was described, e.g., in FIGS. 3a to 3c. A third microlens array 130' is arranged at a distance a2 of about 200 μm from the second microlens array 140'. The third microlens array 130' includes a plurality of second imaging lenses 130 as was described, e.g., in FIGS. 2a to 2b. The microlens array 130' is thus identical with the microlens array 120', but is arranged the other way around in its orientation in the x direction. A digital image sensor 430 is arranged, bordering on the third microlens array 130', at a distance a1 of about 1.3 mm from the third microlens array 130'. On a surface facing the third microlens array 130', the digital image sensor 430 may have a cover glass for protecting the digital image sensor 430. The first microlens array 120', the second microlens array 140' and the third microlens array 130' are arranged such that an imaging lens 120 of the first microlens array 120' and a field lens 140 of the second microlens array 140' and an imaging lens 130 of the third microlens array 130' each form an optical channel 110. The device 400 and/or the optical channels 110 are symmetrical about a symmetry axis 170 of the device 400 and/or of the optical channels 110. The image sensor 430 having an extension of, e.g., 6.55 mm×4.92 mm predefines, in connection with the optical channels 110, the dimensions of the maximally imageable object area. In addition, the image sensor 430 comprises individual pixels having a diameter of, e.g., 3.2 μm, which thus corresponds to the smallest possible depictable detail of the object field. Due to the symmetry of the device 400, the test pattern 420 or at least part of same is imaged 1:1 to the image sensor 430; that is, the test pattern 420 is neither magnified nor demagnified. The illumination device 410 serves to illuminate the test pattern 420.

The first imaging lenses 120 of the optical channels may be arranged on a first shared carrier substrate 440a and form a field of first imaging lenses. The second imaging lenses 130 of the optical channels may be formed on a second shared carrier substrate 440b and form a field of second imaging lenses. The field lenses 140 of the optical channels may be arranged on a third shared carrier substrate 440c and form a field of field lenses.

It shall be noted that any measures of length and any materials mentioned in the preceding embodiments merely represent exemplary values and materials and are therefore not to be interpreted as limiting in any way.

Due to utilization of 1:1 imaging in embodiments of the present invention, which allows a symmetry between the object and the image space, the optics may be symmetrical in embodiments, which is uncommon. The absolute symmetry about the intermediate-image plane is absolutely exploited in terms of design and is advantageous, irrespective of how the lenses and apertures are distributed among possible substrates and air gaps, which enables intrinsic corrections of coma, distortions and transverse chromatic flaws. It shall be noted that intrinsic correction has so far been known only for the symmetry about the system aperture of an optical device. However, embodiments of the present invention may achieve similarly positive effects with a symmetry about the intermediate-image plane. A smaller astigmatism may be achieved by utilizing thinner substrates.

Further embodiments may include aspheres for correcting spherical aberrations. This means that at least one of the two imaging lenses or the field lens is formed as an aspheric lens. In addition, correction of the longitudinal chromatic flaw may be achieved by combining materials having different dispersion properties for implementing achromatic lenses, as was shown by means of the imaging lens 120 in FIGS. 2a to b.

In further embodiments of the present invention, several optical channels may be arranged in a hexagonal arrangement within the intermediate-image plane with a hexagonal shape of the field diaphragms and may thus achieve a maximized filling factor and, consequently, maximum luminance.

By utilizing numerous diaphragms and a large intermediate-image demagnification in further embodiments of the present invention, and, thus, by utilizing small diaphragm diameters in relation to the channel distance, effective suppression of phantom light may be achieved.

Even though in the embodiments shown, the distances of the lenses and planes and, thus, also the lateral extension of the embodiments were constant, further embodiments of the invention may have variable distances. This may be achieved, for example, by introducing actuating elements $A_1, A_2, A_3, A_4$ (see FIG. 1b) into all or some specific air gaps. In other words, the distances $a_1$ and $a_2$ (see FIG. 1b) between the object plane and the first imaging lens, between the first imaging lens and the field lens, between the field lens and the second imaging lens, and between the second imaging lens and the image plane may be varied. This enables taking pictures of height profiles and/or topological profiles (so called "small z scan"). If F/# is sufficiently small, there will only be a limited focal depth range, which is why one obtains knowledge, from the actuator position, of the object distance that is being imaged sharply at this moment. This enables taking a 3D picture, which is composed of the 2D lateral resolution and the information about the height at which this scene is located. To obtain the symmetry of the device, the object and image distances and the two distances of the first and second imaging lenses to and from the intermediate-image plane are to be varied, advantageously at the same time. However, said two distances are to be varied only to a smaller extent and jointly in the opposite direction so that at the same time, the imaging remains sharp, and the object and/or image joint is maintained; in other words, not only is overall focusing to be maintained, but also that of the intermediate image. Embodiments present invention may thus enable 3D microscopy.

A variation of the distance of the lenses and/or planes in relation to one another may be achieved, for example, by piezo or MEMS elements placed within the air gaps.

One variant of a specific embodiment as is shown in FIG. 4, comprising distribution of the lenses to only four substrates and/or three elements, may represent the minimum technical effort that may be made in order to achieve the optical correction state; naturally, it is also possible to utilize a larger number of lenses and/or substrates while taking into account the symmetry of the entire device and/or of the optical channels. Utilization of an array approach, i.e. utilization of microlens arrays, as was shown in FIG. 4, and wafer-level production technology may offer almost any lateral scalability in embodiments of the present invention.

In addition, one may state that in embodiments having a multitude of optical channels, 1:1 imaging is advantageous in order to achieve an object- and image-wise joint.

Demagnification might also be used, whereas in the event of magnification, object details would be lost in the event of imaging by means of the microlens arrays, since an image cannot be larger than a channel distance without losing information; in particular, this applies to the event that in the yz plane, i.e. perpendicularly to the optical path of the imaging device, nothing is to/can be moved, i.e. no scanning is performed. However, if scanning is performed in the yz plane, the imaged object area again may be smaller than the channel distance.

Embodiments might therefore enable scanning in the yz plane so as to scan an object area which is smaller than the channel distance. In other words, scanning gaps may be avoided by a movement in the yz plane in embodiments. The optical imaging device may comprise at least one actuator 111 (see FIG. 1a) to move the optical channel 110 perpendicularly to the lateral extension of the optical channel 110 so that that part of the object which is located within the object plane (150) of the optical channel 110 and is to be imaged will vary.

Therefore, one goal consists in achieving at least one object field joint, at best with a simultaneous image field joint, which places difficult requirements upon the tolerances of manufacturing and assembly, however, since sharp images are to be demanded at the same time within the individual channel.

In embodiments of the present invention it is advantageous for only smallest areas to exist at the image joints of several optical channels to which two adjacent channels contribute at the same time; that is, the optical channels overlap only slightly in their detection areas. If joining of the individual object fields is to be achieved, a redundancy may be tolerated, since said redundancy may be used or corrected electronically as long as there are no scanning gaps and/or as long as no information from the object field is missing. With a slightly demagnified imaging, i.e. with an object-field-only joint, partial images result which are geometrically isolated from one another and may be assembled electronically.

In embodiments of the present invention, different digital image sensors may be arranged within the image plane, e.g., CCD, CMOS, image sensors or polymer photodiode fields, which are actually two-dimensional. Embodiments of the present invention may extend to include an entire wafer, e.g., 4 inches, 6 inches or 8 inches, in terms of their dimensions. Utilization of polymer photodiode fields may further reduce manufacturing of devices in accordance with embodiments of the present invention, since utilization of CMOS and CCD currently still causes cost problems. The size of the image area that is caused by 1:1 imaging therefore does not cause any more problem in the long term when using polymer photodiode fields.

Further embodiments of the present invention may perform shading correction, for example, to calibrate brightness modulations as artifacts of array geometry by means of software, i.e. via a table (so called lookup table), for example.

In addition, in embodiments, a movement of the optics by at least one channel period or advantageously several ones may be used during exposure time or advantageously considerably more often so as to be able to correct artifacts which result from the array geometry of the arrangement, or to be able to correct channel defects without any image processing (shading correction), or for averaging out interference objects for object points transmitted by two adjacent channels at the same time. This movement may be performed by means of piezo benders, piezo stacks, a mechanically translated piezo stack, a coil or an electrical actuator, for example.

Digital image sensors used in embodiments of the present invention may advantageously have a resolution better than 200 . . . 300 line pairs per mm, which corresponds to a pixel size of 2.5 . . . 1.67 μm. For said sizes, it will be the diffraction limit, rather than the pixel size or optical aberrations, which dominates the resolution capability. By reducing the f-number (F/#), said diffraction limit as well as the luminance of the system may be further improved; however, the proportion of optical aberrations will grow disproportionately.

Embodiments of the present invention are characterized by an extremely short constructional length; for example, the distance between the object and the image may be much smaller than 1 cm; in addition, the examinable object surface scales with the image sensor surface and/or with the number of channels used in the optical field, which may result in a surface area much larger than 1 $cm^2$ or even larger than 7 $cm^2$; in addition, minimally examined objects are sometimes limited only by the pixel size of the digital image sensor used, which may be much smaller than 5 μm or even smaller than 2 μm, for example, as a result of which a high resolution is enabled due to the optical approach of consistently minimizing aberrations by utilizing a multitude of optical channels, which approach may be employed in embodiments of the present invention.

Utilization of polymers in embodiments, for example ORMOCER-on-glass technology, enables manufacture on the basis of reflow soldering and is highly suited for diaphragm arrays on the glass substrates and for transforming already modeled structures for achromatization, as we described, e.g., in FIGS. 2a to 2b by means of the imaging lens 120.

In addition, at least some embodiments of the present invention may be produced at low cost since they may be assembled at the wafer level. In addition, it is to be noted that embodiments of the present invention may be manufactured as a unit in arrays rather than as individual lateral components, as a result of which subsequent assembly of the individual components, which would be costly, will be dispensed with.

Embodiments may be applied in digital microscopy, in macrophotography, in medical technology, in fluorescence microscopy or in incubator monitoring, for example.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A device for optically imaging at least part of an object onto an area of a digital image sensor, comprising:
   an optical channel comprising a first imaging lens arranged on a first substrate, a second imaging lens arranged on a second substrate, and a field lens arranged on a third substrate;

the first imaging lens and the second imaging lens being identical;

the first imaging lens and the second imaging lens being arranged such that a first surface of the first imaging lens is a light entry surface of the optical channel and that a first surface of the second imaging lens is a light exit surface of the optical channel;

the field lens being arranged between the first imaging lens and the second imaging lens such that an axis running perpendicularly to a lateral extension of the optical channel and through a lateral center of the field lens forms a symmetry axis of the optical channel;

the field lens comprising a first diaphragm arranged within a lens body at the lateral center of the field lens, the first diaphragm defining the aperture of the field lens and having a hexagonal opening; and at least one further optical channel identical with the optical channel, the optical channels being arranged in a hexagonal distribution such that detection areas of the optical channels will partly overlap, wherein a lateral axis of each optical channel runs though the center of the light entry surface of the optical channel and through the center of the light exit surface of the optical channel, and wherein the field lens comprises a second diaphragm and a third diaphragm, the second diaphragm being laterally arranged in front of first diaphragm, the third diaphragm being laterally arranged behind the first diaphragm, and a lateral distance of the second diaphragm from the first diaphragm being identical with a lateral distance of the third diaphragm from the first diaphragm.

2. The device as claimed in claim 1, wherein that part of the object that is to be imaged is located within an object plane of the optical channel, and wherein that area of the digital image sensor to which said part of the object is imaged is located within an image plane of the optical channel;

an extension of the object plane of the optical channel being identical with an extension of the image plane of the optical channel.

3. The device as claimed in claim 2, wherein a lateral distance of the object plane of the optical channel from an intermediate-image plane of the optical channel is variable, and wherein a lateral distance of the image plane of the optical channel from the intermediate-image plane of the optical channel is variable; and the intermediate-image plane of the optical channel extending in parallel to the object plane and in parallel to the image plane of the optical channel and through the lateral center of the field lens.

4. The device as claimed in claim 3, comprising at least one actuator configured to vary a distance of the first imaging lens from the intermediate-image plane and a distance of the second imaging lens from the intermediate-image plane as well as a distance between the second imaging lens and the image plane.

5. The device as claimed in claim 2, comprising a digital image sensor arranged within the image plane.

6. The device as claimed in claim 2, comprising at least one actuator configured to move the optical channel perpendicularly to the lateral extension of the optical channel, so that that part of the object which is located within the object plane of the optical channel and is to be imaged will vary.

7. The device as claimed in claim 1, wherein a second surface, facing the field lens, of the first imaging lens and a second surface, facing the field lens, of the second imaging lens are formed as achromats so as to reduce longitudinal chromatic flaws, and/or are aspherical so as to reduce spherical aberrations.

8. A device for optically imaging at least part of an object onto an area of a digital image sensor, comprising:

an optical channel comprising a first imaging lens arranged on a first substrate, a second imaging lens arranged on a second substrate, and a field lens arranged on a third substrate;

the first imaging lens and the second imaging lens being identical;

the first imaging lens and the second imaging lens being arranged such that a first surface of the first imaging lens is a light entry surface of the optical channel and that a first surface of the second imaging lens is a light exit surface of the optical channel;

the field lens being arranged between the first imaging lens and the second imaging lens such that an axis running perpendicularly to a lateral extension of the optical channel and through a lateral center of the field lens forms a symmetry axis of the optical channel;

the field lens comprising a first diaphragm arranged within a lens body at the lateral center of the lens, the first diaphragm defining the aperture of the field lens and having a hexagonal opening; and at least one further optical channel identical with the optical channel, the optical channels being arranged in a hexagonal distribution such that detection areas of the optical channels will partly overlap, wherein a lateral axis of each optical channel runs though the center of the light entry surface of the optical channel and through the center of the light exit surface of the optical channel, and wherein the first imaging lens and the second imaging lens each comprise two diaphragms;

the two diaphragms of the first imaging lens being laterally arranged one behind the other between the first surface of the first imaging lens and a second surface of the first imaging lens; and the two diaphragms of the second imaging lens being laterally arranged one behind the other between the first surface of the second imaging lens and a second surface of the second imaging lens.

\* \* \* \* \*